United States Patent Office 2,756,259
Patented July 24, 1956

2,756,259
METHOD FOR PREPARING QUATERNARY AMMONIUM BOROHYDRIDES

Robert W. Bragdon, Marblehead, Mass., assignor to Metal Hydrides Incorporated, Beverly, Mass., a corporation of Massachusetts No Drawing. Application May 17, 1954,
Serial No. 430,440

2 Claims. (Cl. 260—567.6)

This invention relates to the preparation of quaternary ammonium borohydrides, such as tetramethylammonium borohydride.

A method has been proposed previously for the preparation of quaternary ammonium borohydrides comprising a metathetical reaction of sodium borohydride and a quaternary ammonium compound, such as a quaternary ammonium hydroxide, in a solvent. The use of substantially pure sodium borohydride was required. The selection of methanol as a solvent medium for these metatheses was precluded by the instability of the quaternary ammonium borohydrides in methanol.

The reaction of sodium borohydride in water with tetramethylammonium hydroxide is illustrative of the above prior method. The reaction liquor produced was essentially a solution of tetramethylammonium borohydride and sodium hydroxide in water. The water was evaporated and the residue was treated with ethanol to wash out the sodium hydroxide. This is a time-consuming and expensive operation and is not well suited to commerical production techniques.

The United States patent to H. I. Schlesinger and H. C. Brown No. 2,534,533 describes several methods for the preparation of sodium borohydride. One method comprises reacting sodium hydride with an alkyl borate, such as methyl borate, to form a reaction mixture of sodium borohydride and a sodium alkoxide, such as sodium methoxide. Another method comprises reacting sodium hydride with a sodium alkoxylborohydride, such as sodium trimethoxyborohydride, to form a reaction mixture of sodium borohydride and a sodium alkoxide, such as sodium methoxide. A third method comprises reacting sodium hydride with boric oxide to form a reaction mixture of sodium borohydride and sodium borate.

The present invention is based in part upon the discovery that tetramethylammonium borohydride is stable in the reaction liquor produced by adding a solution of tetramethylammonium hydroxide in methanol or ethanol to a methanol solution of the reaction mixture resulting from the reaction of sodium hydride and methyl borate. This causes the nearly quantitative precipitation of tetramethylammonium borohydride in the reaction liquor which is a solution of sodium methoxide, sodium hydroxide and any excess of tetramethylammonium hydroxide used. The solid product can be recovered by filtration or centrifugation and washing with ethanol. In the practice of the invention I prefer to employ an amount of solvent not exceeding substantially the amounts required to form saturated solutions of the reactants and thus assure stability of the quaternary ammonium borohydride in the reaction liquor.

The method of the present invention possesses many advantages as compared to the prior method for preparing quaternary ammonium borohydrides previously mentioned. Thus, in the method of the present invention, the reaction mixture produced by reacting sodium hydride with an alkyl borate can be used directly without the necessity of first isolating the sodium borohydride. The desired product is precipitated in neary quantitative yield, thus obviating the necessity for costly vacuum evaporation steps. All the steps in the method of the present invention are easily adapted to commercial production.

In the practice of the invention, the reaction mixture of sodium borohydride and sodium alkoxide may be replaced by the above mentioned reaction mixture of sodium borohydride and sodium borate. Also, in place of tetramethylammonium hydroxide other tetramethylammonium compounds which are soluble in methanol, ethanol, and mixtures thereof and whose anions form compounds with sodium which are soluble in such solvents.

The invention is illustrated further by the following specific example. The reaction mixture obtained from a reaction of sodium hydride and methyl borate was found to contain 16.4 percent by weight of sodium borohydride, the balance being essentially sodium methoxide. 100 grams of this reaction mixture was dissolved in 400 grams of anhydrous methanol. To the resulting solution was added 183.3 grams of 21.5 percent tetramethylammonium hydroxide solution in ethanol which is the amount of tetramethylammonium hydroxide required theoretically to react completely with the above amount of sodium borohydride to form tetramethylammonium borohydride. The mixture was shaken for five minutes and the resulting precipitate was then recovered by filtration and was washed with three 100 gram portions of ethanol and two 100 gram portions of diethyl ether. The solid product was then dried in vacuo at 100° C. 31.5 grams of tetramethylammonium borohydride, which analyzed 97.6 percent pure by hydrogen evolution, was obtained.

I claim:

1. The method for preparing tetramethylammonium borohydride which comprises mixing a substantially saturated solution of tetramethylammonium hydroxide in a solvent selected from the group consisting of methanol, ethanol and mixtures thereof with a substantially saturated solution in methanol of a mixture of sodium borohydride and sodium methoxide thereby precipitating tetramethylammonium borohydride in substantially quantitative yield in the resulting reacting liquor which includes sodium methoxide in solution therein, the amount of tetramethylammonium hydroxide used being at least equal to the amount theoretically required to react completely with the amount of sodium borohydride used to form tetramethylammonium borohydride, the relative amounts of sodium borohydride and sodium methoxide in said mixture corresponding to the relative proportions of these compounds in a reaction mixture resulting from the reaction of sodium hydride and methyl borate.

2. The method for preparing tetramethylammonium borohydride which comprises mixing a substantially saturated solution of tetramethylammonium hydroxide in methanol with a substantially saturated solution in methanol of a mixture of sodium borohydride and sodium methoxide thereby precipitating tetramethylammonium borohydride in substantially quantitative yield in the resulting reaction liquor which includes said sodium methoxide in solution therein, the amount of tetramethylammonium hydroxide used being at least equal to the amount theoretically required to react completely with the amount of sodium borohydride used to form tetramethylammonium borohydride, the relative amounts of sodium borohydride and sodium methoxide in said mixture corresponding to the relative proportions of these compounds in a reaction mixture resulting from the reaction of sodium hydride and methyl borate.

References Cited in the file of this patent

UNITED STATES PATENTS 2,534,533     Schlesinger et al. _____ Dec. 19, 1950

OTHER REFERENCES

Banus et al.: JACS, 74, 2346–48 (1952).